(No Model.)

A. EDWARDS.
MERCURY SEAL TRAP.

No. 280,155. Patented June 26, 1883.

WITNESSES:

INVENTOR
Abraham Edwards
By S. J. Van Staveren
Attorney

UNITED STATES PATENT OFFICE.

ABRAHAM EDWARDS, OF ASBURY PARK, NEW JERSEY, ASSIGNOR TO ISABELLA S. EDWARDS, OF SAME PLACE.

MERCURY-SEAL TRAP.

SPECIFICATION forming part of Letters Patent No. 280,155, dated June 26, 1883.

Application filed October 20, 1882. (No model.)

*To all whom it may concern:*

Be it known that I, ABRAHAM EDWARDS, a citizen of the United States, residing at Asbury Park, in the county of Monmouth and State of New Jersey, have invented certain new and useful Improvements in Mercury-Seal Traps, of which the following is a specification, reference being had therein to the accompanying drawings, wherein—

Figure 1:
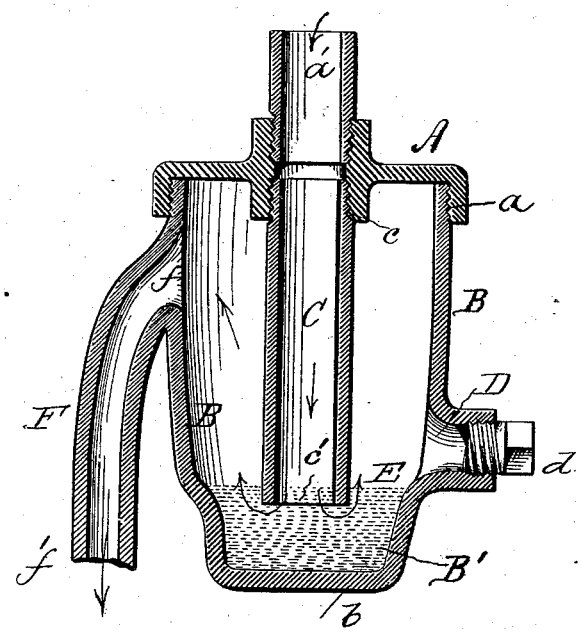
Figure 2:
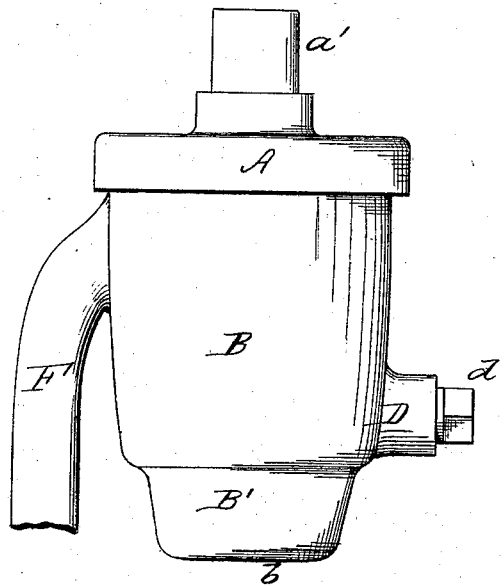

Figure 1 is a longitudinal vertical section of a trap embodying my invention, and Fig. 2 is an elevation of the same.

My invention has relation to mercury-seal traps for wash-stands, bath-tubs, &c., and has for its object to provide a trap of extreme simplicity of construction, which is easily and inexpensively manufactured, readily and effectually cleansed without disturbing the parts of the trap or its mercury-seal, and which is exceedingly efficient in preventing the passage of sewer-gas or odors therethrough.

My invention consists of the novel construction of parts hereinafter described and claimed, comprising a trap composed of a body or bowl having a cleaning-out opening, an eduction-pipe, and a lower chamber for holding mercury, into which dips a tube depending from a cap or cover. The latter is screwed to the body of the trap, so as to be detachable therefrom, and is made of brass, lead, or other metal which will solder or permit a solder joint to be made thereon. Its depending tube and the body of the trap are composed of iron or other non-amalgamable material.

Referring to the accompanying drawings, which represent a trap constructed according to my invention, A designates a cap or top, screwed at $a$ to the body B, which forms the sealing-chamber of the trap. Into said cap leads the induction-pipe $a'$ of the wash-stand or other fixture.

C represents a tube, screwed at $c$ to said cap, and forms a continuation of the induction-pipe $a'$, as shown. Said tube C depends from cap A, extending down into chamber or bowl B, reaching nearly to its bottom $b$, on which mercury is designed to be placed, as represented at E, to seal the lower edge, $c'$, of tube C, as illustrated. Said tube is preferably lined with porcelain or other smooth material for preventing sedimentary matter adhering to or accumulating on its walls. Said porcelain lining is represented by the heavy or thick black lines $x$, bounding the bore of the tube C. The body or chamber B is provided with a cleaning-out opening, D, located above the surface of the mercury E, and which is closed by a removable stopper or plug, $d$.

F represents an eduction-pipe formed integral with body B, its opening $f$ being located just below the joint of the cap A and body B, to avoid leakage of water therethrough. The cap A and induction-pipe $a'$ are composed of brass or other metal, on which a joint with a lead pipe may be formed by soldering; but the tube C and bowl B are made of iron or other material which will not amalgamate with the mercury. I prefer, however, to make the bowl B of iron and tin, the end $f''$ of pipe F forming a solder joint with the waste-pipe.

The trap being constructed as described, and provided with mercury, as indicated, the induction-pipe $a'$ is soldered to the pipe from the wash-stand, &c., and the eduction-pipe F similarly connected with a pipe leading to a sewer or other outlet or receptacle. When sufficient water accumulates in the waste and induction pipes, the mercury is displaced or forced out of the lower end of tube C into chamber B, unsealing the end $c'$ of said pipe and affording an outlet or passage for the water, which escapes through the eduction-pipe. After such escape the mercury resumes its normal position, as illustrated, forming a seal which effectually excludes the admission of sewer-gas or odor to the wash-stand or fixture through the trap. By reason of the construction of the latter it is secured in position without necessitating the use of screw-couplings.

The pipe C being centrally located and perfectly straight, without crook or bend, avoids the objection to curved or "goose-neck" induction-pipes for mercury-seals, which are liable to become foul from sedimentary or other accretions accumulating on the surface of the mercury in the bend of such pipes. Should such sediment collect in bowl B, it is readily removed therefrom through the cleaning-out opening D, and as the latter is located above the mercury the bowl may be thoroughly cleaned without disturbing such fluid. Said bowl, it will be noticed, is formed with a reduced lower portion, B', in which the mercury is placed, so as to reduce to a minimum the amount of mercury to be used for sealing the end of tube C. Such reduced portion B' may be provided for by making the bowl of the shape shown; or said bowl may taper from its top to its bottom.

What I claim as my invention is—

1. A trap for wash-basins, &c., composed of a body, B, designed and adapted to contain a mercury-seal, and provided with an eduction-pipe and a lateral cleaning-out opening, of a removable cap or top for said body, having a depending tube dipping or sealing in said mercury, and an induction-tube, substantially as shown and described.

2. In a trap for wash-stands, &c., the combination, with a body or bowl having a mercury-seal chamber, an eduction-pipe, and a lateral cleaning-out opening, of a detachable or screw top having an induction-pipe and an aligning depending tube of non-amalgamable material, which dips into said mercury to be sealed thereby, substantially as shown and described.

3. A trap for wash-basins, &c., composed of body B, of non-amalgamable material, having eduction-pipe F, the opening $f$ of which is located below the top edge of said body, and a lateral cleaning-out opening, D, placed above the surface of the mercury-seal E, of a screw top or cap, A, having induction-pipe $a'$ and a depending tube, C, lined with porcelain, substantially as shown and described.

4. The combination, with top or cover A, having induction-pipe $a'$ and depending tube C, of the body B, having reduced portion B', cleaning-out opening D, and eduction-pipe F, substantially as shown and described.

In testimony whereof I affix my signature in presence of two witnesses.

ABRAHAM EDWARDS.

Witnesses:
S. J. VAN STAVOREN,
CHAS. F. VAN HORN.